Nov. 10, 1953  A. C. PETERSON  2,658,335
GAS TURBINE SYSTEM OF INTERMITTENT COMBUSTION TYPE
Filed Nov. 17, 1948  4 Sheets-Sheet 2
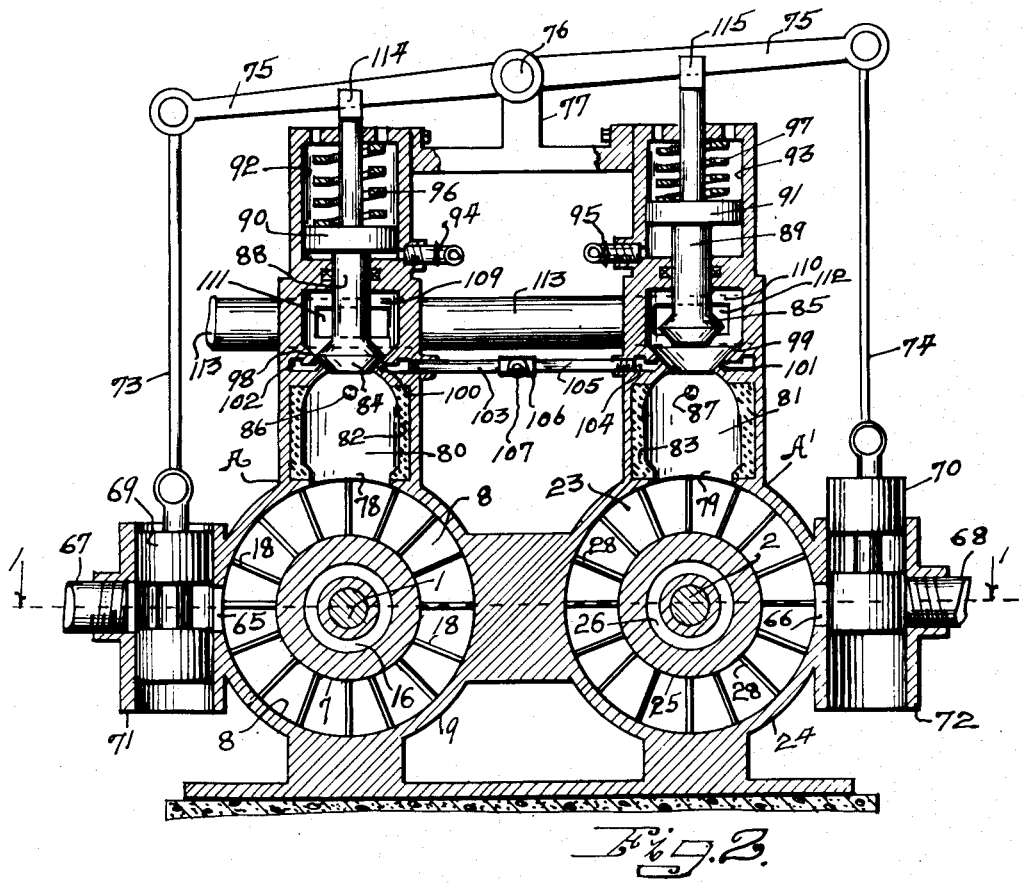
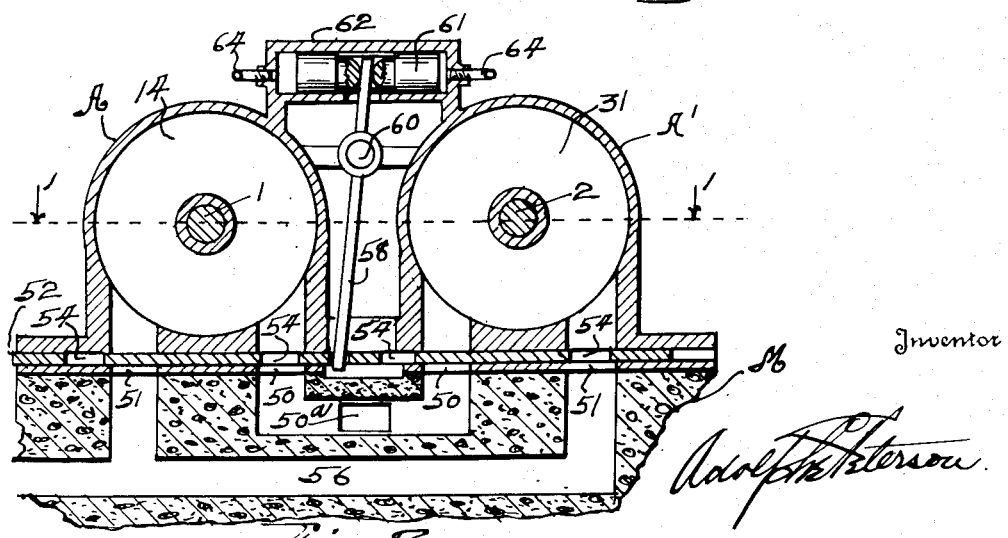
Inventor
Adolph C. Peterson Nov. 10, 1953          A. C. PETERSON                2,658,335
            GAS TURBINE SYSTEM OF INTERMITTENT COMBUSTION TYPE
Filed Nov. 17, 1948                                  4 Sheets-Sheet 3
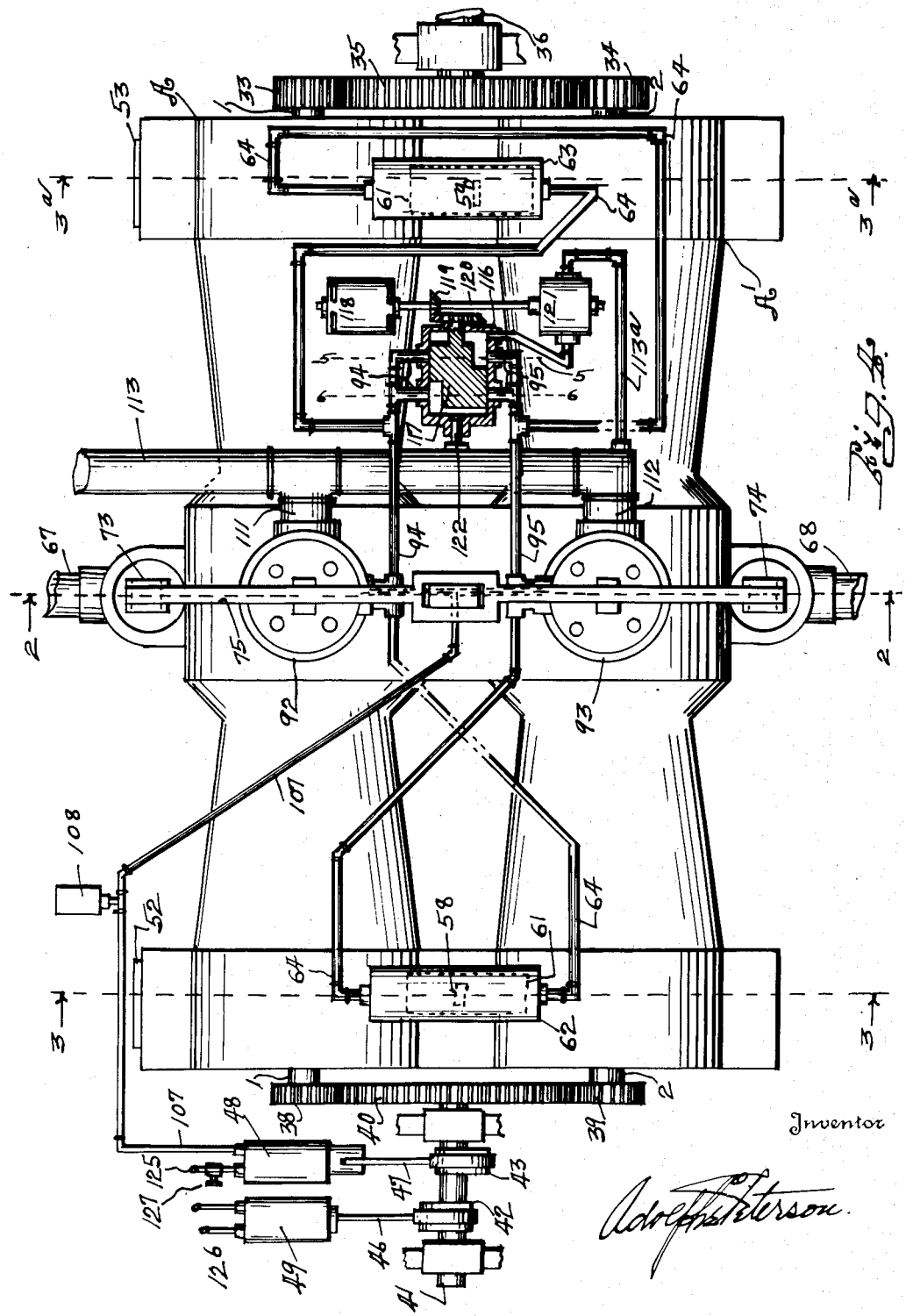
Inventor
Adolph Peterson.

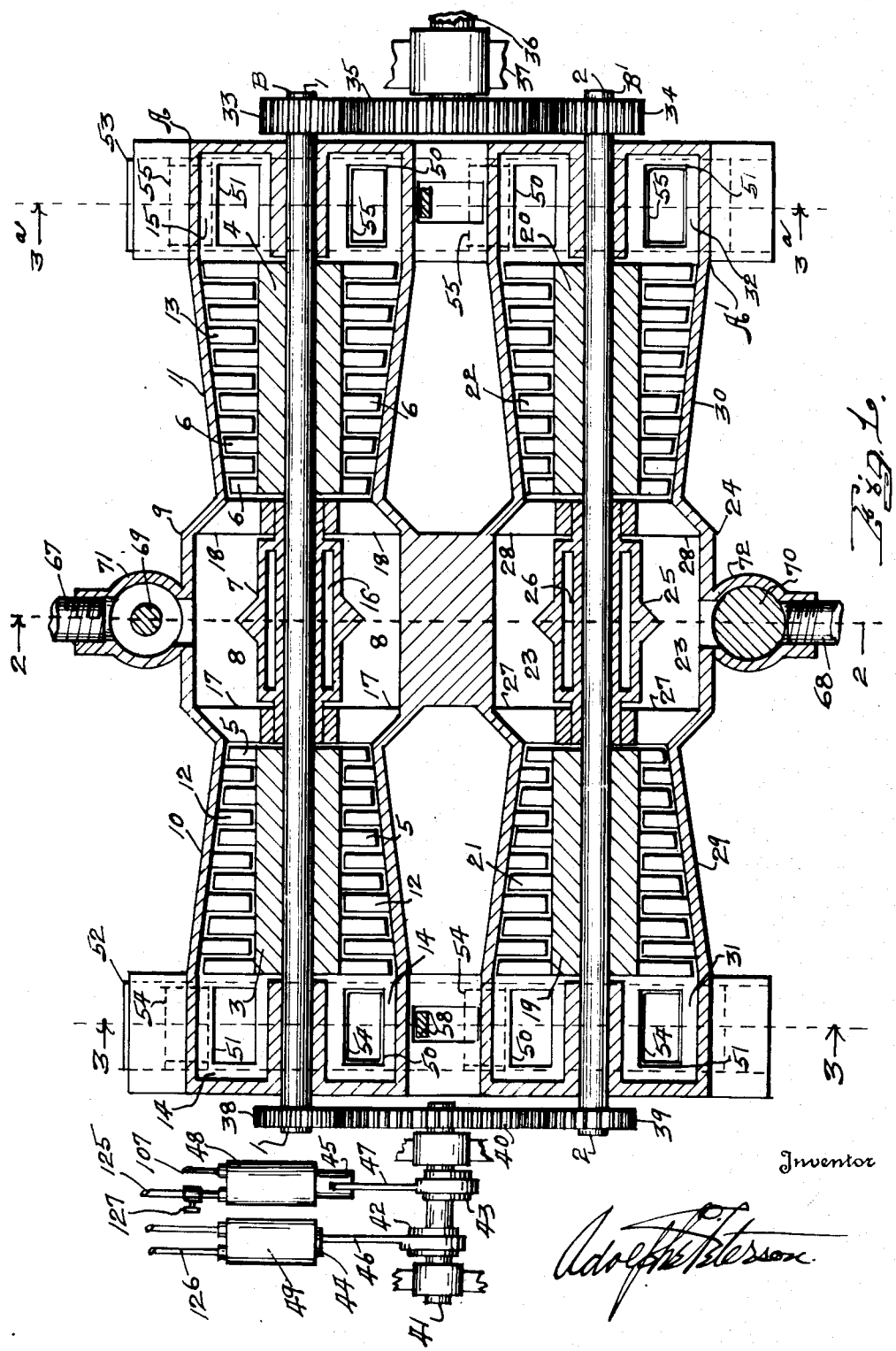

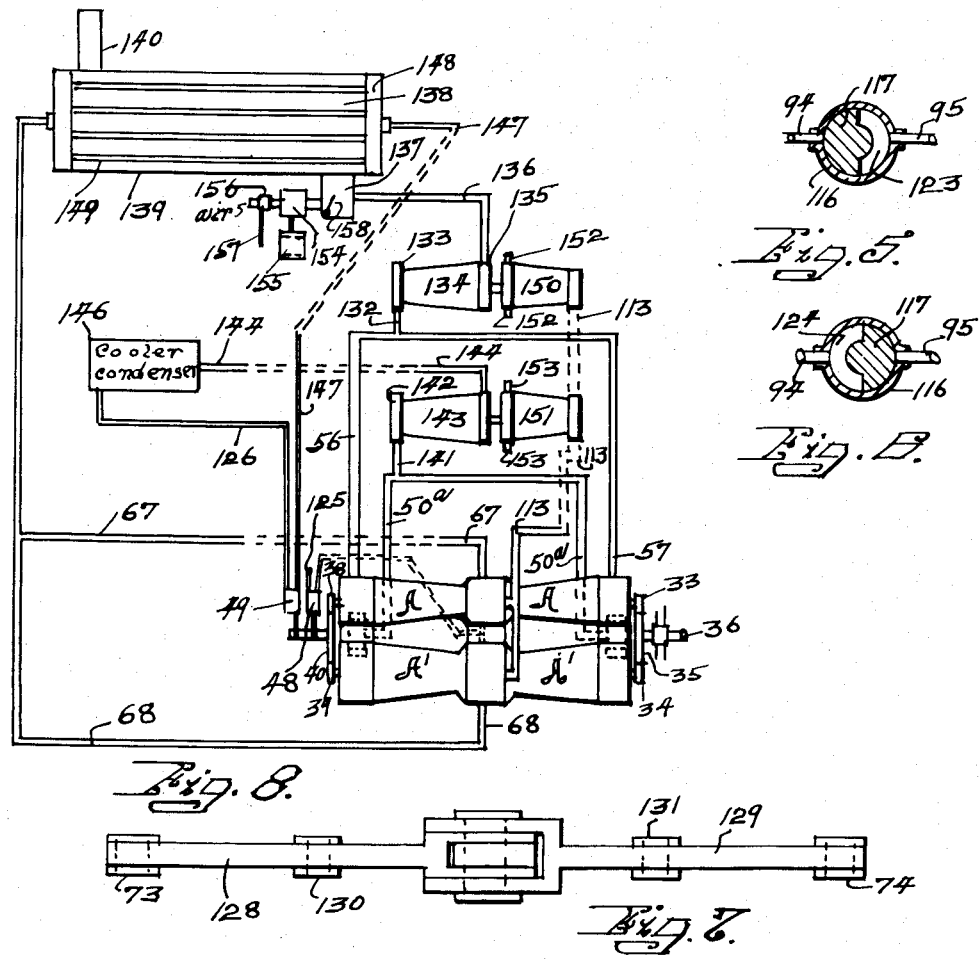

Patented Nov. 10, 1953

2,658,335

UNITED STATES PATENT OFFICE 2,658,335

GAS TURBINE SYSTEM OF INTERMITTENT COMBUSTION TYPE

Adolphe C. Peterson, Minneapolis, Minn.

Application November 17, 1948, Serial No. 60,613

10 Claims. (Cl. 60—39.18)

My invention relates to combustion turbines and particularly to such means having unusual characteristics wherefore it is called Gas Turbine System of Intermittent Combustion Type.

The principal object of my invention is to provide a form of gas turbine which is adapted to use with high temperature combustion gases and is therefore more efficient in its use of fuel and may be made, in large plants particularly, to use less space for its construction and installation and would generally be less expensive in construction first cost. Gas turbines, as they have been constructed and designed, have usually had a high temperature limitation of approximately twelve hundred or thirteen hundred degrees Fahrenheit in the gases flowing to the turbine rotor, and this limitation has held the efficiency of the turbine lower than would have been the case if higher temperatures had been permissible in flow through the rotor means. Alloys have been tried as a factor in reducing the effect of temperature on the rotor blades and other methods of internal cooling have been tried or proposed, but none of these methods have essentially raised the upper limit of temperature in the gases used. My invention as its principal feature provides a novel method of use of combustion gases and another flow of fluid in the turbine so that the temperature limit of the combustion gas used in the turbine may be considerably higher than the thirteen hundred degrees maximum, heretofore used. The maximum upper limit of temperature in my novel turbine may reach as high as 2000 degrees Fahrenheit or even, in some installations, where the best of alloys are used, temperatures as high as 2500 degrees Fahrenheit, or as high as would normally be attainable, may be used without extraordinary or prohibitive deterioration of the rotor and its blades or the stator blades. This capacity of my turbine means in conjunction with its use of the gases available, renders possible a much greater efficiency and would therefore save much cost of fuel in its use and greatly extend the use of gas turbines in industry and transportation especially.

The improved efficiency, attainable, would render my means available for transportation uses of high and low power, such as locomotives or automobiles, and would likewise render its use possible for large power plants and small power plants, and by increase of efficiency, would reduce the relative expense of operating such plants.

In the accompanying drawings which illustrate my invention, in different forms or applications, like characters refer to like parts in so far as possible. Referring to the drawings:

Figure 1 is a view chiefly in horizontal cross section through the plane of the axes of the principal operating elements of my device, some parts being shown in full plan view and some parts being broken away, the section being on lines 1—1 of Figures 2 and 3.

Figure 2 is a vertical section at right angles to that of Figure 1, on the lines 2—2 of Figures 1 and 4, some parts being shown in full elevation and some broken away.

Figure 3 is a vertical section at right angles to that of Figure 1 on the lines 3—3 of Figures 1 and 4, some parts being shown in full side elevation and some broken away.

Figure 4 is a plan view of the device shown in Figures 1, 2, 3, on the same scale, there being a detail, the valve controlling means shown in cross section through its operating axis, the valve body being placed above the turbine casings.

Figures 5 and 6 are detail sections on the lines 5—5 and 6—6, respectively of Figure 4, showing the various sections of the controlling valve.

Figure 7 is a modified detail part, showing a slightly modified form of operating beams instead of walking beam for use with the device of Figures 1, 2, 3, 4, so that, in such constructions as found desirable, the timing of the flow alternations can be modified to permit larger or smaller proportions of the one flow and conversely smaller or larger proportions of the other flow.

Figure 9 is a diagrammatic plan view on very small scale, of a modified turbine assemblage of units (single turbines) such as in Figures 1, 2, 3, 4, but showing three of the composing units and a timing means, to illustrate use of this or a larger number of units for change of the timing relation of the alternations.

Figure 8 is a diagrammatic illustration, showing one plan of use of my novel means in conjunction with other supplementing turbines for operation at lower pressures by the exhausts and also the use of heat transfer means and cooler (or condenser) means in conjunction with the so-called secondary flow.

Figure 10 is a diagrammatic sketch showing the cycle of alternations for explanation of the alternations of flow.

A section on the line 3ª—3ª would be similar to the section on line 3—3 of Figs. 1 and 4, as shown in Fig. 3, and is therefore not shown.

Referring first to the figures from 1 to 4, both inclusive, these figures illustrate the unit which forms the principal operating device of a plant embodying my device, and may in some constructions form essentially the plant (a compressor being added in some operating form), and in these figures there are two turbine devices denoted A and A¹, respectively, and two rotors, denoted B and B¹, respectively. It should be noted here that while these two operating turbines are shown as mounted on two shafts 1 and 2, respectively, that is not essential in construction, as they may be mounted on one shaft the general construction being modified as necessary for such alternative construction. They are preferably mounted on two shafts in order that the assemblage may be more compact.

The rotors, generally designated B and B¹, are placed so that their shafts 1 and 2 are in the same horizontal plane and parallel to each other and relatively near each other. Shaft 1 has two blade rotors 3 and 4, respectively, each having rotor blades 5 and 6, respectively mounted on each in a number of stages, and between the two blade rotors there is a bearing 7 and annularly about the bearing there is an annular chamber 8 which may be called a nozzle feed-chamber, and this is enclosed by the annular casing 9. The latter is formed centrally between the annular turbine casings 10 and 11, respectively, of turbine device A, and the casings 10 and 11 enclose the blade rotors 3 and 4 with their blades 5—6, so that the annular nozzle feed chamber 8 between them, is open in the opposite directions, axially, to the annular space between blade rotor 3 and casing 10 in one direction and to the annular space between blade rotor 4 and casing 11 in the opposite direction. The casing 10 has stator blades 12 in annular stages alternated with rotor blades 5; and the casing 11 has stator blades 13 in annular stages alternated with rotor blades 6. The casing 10 at the exhaust end is open to exhaust chamber 14 and the casing 11 at the exhaust end is open to the exhaust chamber 15. The bearing 7 has an internal cooling space which may be cooled, as may be necessary with the lubricating oil, or otherwise. The means for circulating oil or a cooling medium to this space 16, which is annular, is not shown since any means commonly used may be included it being noted that while some cooling of this bearing may be necessary, not as great cooling would be needed as in commonly known constructions.

The casings 10 and 11 have at their ends adjacent annular nozzle feed chamber 8 guide nozzle blades or expansion nozzle blades 17 and 18 forming these nozzles. These nozzles are directing nozzles which direct the operating fluids to the rotor blade spaces, the guides being so directed that the flow is in the same direction annularly into each casing so the blade rotors absorb energy driving them in the same direction rotationally of shaft 1.

Turbine device A¹ and its rotor B¹ are similar in construction to those above described, and its shaft 2 has mounted on it blade rotors 19, 20, with blades 21, 22, respectively, and there is between these blade rotors, annular nozzle feed chamber (or guide chamber) 23, enclosed by casing 24, bearing 25, space 26 within bearing 25, guide nozzle blades or expansion nozzle blades 27 to one side and 28 to the other side of annular chamber. The nozzles formed by the nozzle blades 27 and 28 deliver, respectively to annular spaces in annular turbine casings 29 and 30, the delivery being in one direction axially to one and in the other direction axially to the other. The turbine casings 29 and 30 of this turbine device A¹ at their exhaust ends deliver, one to exhaust chamber 31 and the other to exhaust chamber 32.

The shafts 1 and 2 have fixed on their ends, at ends adjacent to each other, small spur gears 33, 34, respectively, and these are permanently in engagement with opposite sides of a larger spur gear 35, the reduction being say eight to ten to one, or such a reduction as is found appropriate. The spur gear 35 is fixed on a power shaft 36 rotatably mounted in fixed bearing standard 37, and the power shaft may be connected with any element to be driven, such as a ship propeller, an airplane propeller, an electric generator armature or any load shaft.

The shafts 1 and 2, at their other adjacent ends, have fixed on them, small spur gears 38, 39, respectively, and these are in engagement with opposite sides of a larger spur gear 40, to drive the latter at a reduced rate. The gear 40 is fixed on pump shaft 41, which has two eccentrics 42, 43, respectively, which drive pump pistons 44, 45, through connecting rods 46, 47 respectively, the pump pistons reciprocating in pump cylinders 49, 48, respectively. The pump 48 is a fuel pump. The pump 49 is a secondary fluid pump, such as a water pump.

Each exhaust chamber 14, 15, as to turbine device A, and 31, 32 as to turbine device A¹, has two exhaust ports 50 (in all chambers) being a secondary fluid exhaust port, and 51 (in all chambers) being a combustion gas exhaust port. That is, there is one of each in each chamber, a second fluid exhaust port and a combustion gas exhaust port. Thus there is a pair, one of each in each exhaust chamber, for to exhaust from the associated turbine casing, and the ports of each pair are alternately opened by the means hereinafter described and this alternation proceeds in continuous cycle. One exhaust valve 52 controls the ports of two exhaust chambers at adjacent ends of turbine devices A and A¹ and another exhaust valve 53 controls the ports of the other two exhaust chambers at the opposite adjacent ends of turbine devices A and A¹, and each of these exhaust valves is mounted under the exhaust chambers within a closely fitting formed section of the material of the castings, so that the exhaust valves will move horizontally and transversely of the exhaust ports. The one valve 52 has four ports formed therein, each denoted 54 and the other valve 53 has four ports, each denoted 55, formed therein. The ports are located in each valve, so that they will permit the flow from the exhaust ports of each chamber in the alternate function, as hereinafter described in connection with the operation. The combustion gas exhaust ports 51 deliver into two exhaust conduits, formed under the device, in the concrete base M (with steel or other liners, as necessary), one so-called gas exhaust conduit 56 being under one end of turbine devices A and A¹ and the other 57 at the other ends of turbine devices A and A¹, so that thus, one gas exhaust conduit serves two annular exhaust chambers at adjacent ends, and the other serves the other two exhaust chambers at the other adjacent ends of the turbine devices A and A¹. Conduit 57 is shown in Fig. 8 only.

The exhaust valve 52 is reciprocated by an oscillating lever 58 and the exhaust valve 53 is reciprocated by an oscillating lever 59, and each of these oscillating levers is fulcrumed, as at 60 (the other having similar mounting) and each is reciprocated by a control piston 61, one control piston in control cylinder 62 at one end, Fig. 4, and the other in control cylinder 63, at the other end, Fig. 4, each cylinder 62 and 63 having delivery or exhaust of operating control fluid, at each end, to place pressure at either end of the piston within, which is double-ended, as shown in Fig. 3. The other is similar. These cylinders are thus served by four conduits, each denoted 64, two for each cylinder, and these are controlled, by the control valve means as hereinafter described.

Each annular nozzle feed chamber (or guide chamber) 8 and 23, has delivery to it by way of port 65, and 66, respectively, of secondary fluid from secondary fluid pressure conduits 67, 68, respectively, as controlled by piston valves 69, 70, respectively in valve casings 71, 72, respectively. The valves 69—70 are reciprocated by connecting rods 73, 74, respectively, and each of these is flexibly fixed on one end of a walking beam 75, the latter being trunnioned at 76 on fixture 77, and being oscillated cyclically as hereafter described.

The annular nozzle feed chamber 8 has delivery to it by port 78 from a combustion chamber 80. The annular nozzle feed chamber 23 has delivery to it by port 79 from a combustion chamber 81. Combustion in these combustion chambers 80 and 81 is in alternated phase, as hereinafter described. The combustion chambers have refractory linings 82 and 83. Flow of air and fuel to combustion chamber 80 is controlled by poppet valve 84 and flow of air and fuel to combustion chamber 81 is controlled by poppet valve 85. Ignition is effected by ignition means 86 and 87, which are diagrammatically shown. The ignition means are served by electric current in any manner.

Each poppet valve 84—85, is mounted at the lower end of a vertical valve rod 88, 89, respectively, and these rods have control pistons, 90—91, reciprocable in cylinders 92—93, the lower part of which, under the control piston may be served by valve operating fluid (as air) by way of conduits 94—95, respectively. The upper side of each control piston, 90—91 is yieldably pressed downwardly by coil springs 96—97, this yieldable seating of poppet valves 84—85 providing for seating of the poppet valves on their seats 98—99 in the alternate periods when there is not combustion in the combustion chambers. Each seat 98—99 has a plurality of fuel injection ports 100—101 about it, these fuel ports being normally closed by the poppet valves 84 and 85. The fuel ports 100 are served by annular chamber 102 and fuel conduit 103 and the fuel ports 101 are served by annular chamber 104 and fuel conduits 105. The fuel conduits 103—105 are joined at 106 and served continuously by the one fuel feed conduit 107 which has delivery continuously from fuel pressure reservoir 108 and fuel pump 48, the pressure of fuel being sufficient to permit flow whenever ports 100 or 101 are open, this being in alternate periods of time. The poppet valves 84—85 permit delivery, when opened, from air chambers 109 and 110, respectively, into the combustion chambers 80 and 81, and this delivery is alternated. The air chambers 109—110 may receive combustion air, under pressure, freely, at any time, from conduits 111, 112, respectively, and these conduits are connected with conduit 113, which in turn receives air under pressure from air compressors as hereinafter described.

The valve rods 88—89 extend upwardly through their related coil springs and at their extreme upper ends have slotted parts 114—115 in which extend the opposite ends of the walking beam 75, so that this walking beam 75 at one end may be moved upwardly by one rod 88 and at the opposite end may be moved upwardly by rod 89. The conduits 94 and 95 are connected with the conduits 64 in the relation shown in Fig. 4, and to produce the action controls, hereinafter described, and each is served by branch conduits (in pairs) also denoted 94 and 95, respectively, from control valve casing 116, wherein is the main cycle control valve 117, this being rotatable, and rotated by electric motor 118 through bevel gears 119, the motor also driving by its shaft 120, the air pump 121, which receives air from conduit 113a and delivers the air under a higher pressure to one end of valve casing 116, the air after performing its function of control being returned to the other end of the valve casing 116 and thereby retuned by conduit 122 to conduit 113, so that thus air under pressure from conduit 113 is used and further compressed to serve the control function.

The cycle control valve 117 as shown, Figs. 5–6, has one port 123 to permit delivery under pressure, (during approximately one half of the cycle) and has another port 124 to permit return of the air under lower pressure (during approximately the other one-half of the cycle), alternately, as to the control conduits.

In the operation and use of my turbine device, air under pressure will be supplied to pressure conduit 113 by any air compressing means but this compressing means will preferably be somewhat as is shown in Fig. 8, which will later be described. The fuel pump 48 will draw liquid fuel or gaseous fuel or even a gas bearing pulverized coal from a supply pipe or means 125. The secondary fluid pump 49 will draw a secondary fluid which may be a gas or a liquid from pipe 126. This secondary fluid may be carbon dioxide or air or nitrogen and carbon dioxide or any substance deemed suitable. In connection with Fig. 8, the apparatus will be described, in operation, as assuming that water is used as the secondary fluid. For the description of the operation of the device shown in Figures 1, 2, 3, 4, it may be assumed that any type of fluid as steam or gas is supplied to the secondary fluid pressure conduits 67 and 68 and that the pressure of this secondary fluid supplied to conduits 67, 68, will be as high as the pressure of the air supplied to conduit 113, but that it may be much higher, say twice or three times as high if that be found advisable in any particular construction. Assuming that the pressure of air in conduit 113 may be say seventy five pounds to 100 pounds per square inch, then the pressure in secondary fluid conduits 67, 68, should be at least this high. The fuel will be supplied by fuel pump 48 at a somewhat greater pressure than the pressure of the air in conduit 113, and this fuel pressure may be as great as one thousand pounds if a liquid fuel is used and the fuel apertures are designed for such pressure.

The shafts 1—2 may be started in revolution by the pressure of secondary fluid supplied by conduits 67—68, if the plant is designed for such starting as described in connection with Fig. 8, or any electric starting motor may be used in connection with shafts 1 or 2 for starting these shafts in rotation. The ignition means is assumed to supply ignition in the combustion chambers from the start. The valve 127 may be used to vary the flow of fuel, or any means such as commonly used may be provided for regulation of the flow. The fuel pump 48 may operate from the start, and may gradually increase the supply of fuel. The electric motor 118 will be supplied with electric current from any supply thereof and control means therefor, and thereupon the valve 117 will rotate at a comparatively slow rate of speed. The speed of this valve 117 will be predetermined by the design of the motor 118 and the gear reduction to valve 117, and this predetermined speed will be determined according to the characteristics desired in the construction and proportioned according to the weights of parts in the device, and their heat absorption rate and heat dispersion rate in operation. The timing of the cycle of operation by the cycle control valve 117 may be such as to produce in some constructions say only twelve alternations per hour, that is, one cycle per five minutes, or in some constructions it may be such as to cause say sixty or even one hundred alternations per hour. Whatever the timing by valve 117, the shafts 1 and 2 will operate at a high rate of speed, and this may in smaller constructions be as high as ten thousand or even fifteen thousand revolutions per minute, and it may in large constructions be as low as say five or six thousand revolutions per minute, but in any case should be sufficiently high to enable sufficient efficiency to be attained, and a sufficient power output to be attained.

When the turbine is now in operating condition, shafts 1—2 operating at say ten thousand revolutions per minute, and the valve 117 rotating at say thirty revolutions per minute, which would be once in every two minutes, the operation proceeds as follows: As valve 117 rotates, the air under a high pressure from air pump 121 is permitted alternately to be delivered to conduits 94 and 95, and in the opposite periods to be exhausted from conduits 94, 95 to conduit 113. Thereby alternately there will be high air pressure under one control piston 90 and at one end of cylinders 62—63 and there will be low pressure under the other control piston 91 and at the other ends of the cylinders 62—63 and in the opposite periods of the cycle there will be low pressure under the first control piston and the associated ends of cylinders 62—63 and there will be high pressure under the other piston and at the other ends of cylinders 62—63. As in Fig. 2 and Fig. 3, in one period of the cycle the control piston 90 will be down and seat poppet valve 84 and the control piston 91 will be up and lift poppet valve 85 from its seat. And while this condition prevails the pistons 61 will both be moved as shown in Fig. 3 moving the slide valves 52—53 as in Fig. 3. In the other period of each cycle, the opposite conditions will prevail, namely, the control piston 90 will be lifted up with poppet valve 84 and the control piston 91 with poppet valve 85 will be lowered on its seat, and at the same time the pistons 61 will be moved to the opposite end of their reciprocation, thus placing slide valves 52—53 in the opposite positions. In the one phase, when a poppet valve is open to a combustion chamber 80 or 81, air will flow into the combustion chamber from conduit 113 and fuel will be discharged from apertures 100 or 101 into the passing air around the poppet valve, and thus the air will be well intermixed with the fuel and combustion will ensue in the combustion chamber and this will continue as long as the poppet valve is open. In the opposite phase the one poppet valve will be closed and the other opened and air will not flow into the same combustion chamber but will flow into the other combustion chamber and fuel will similarly flow into it with the air and combustion will continue as long as the poppet valve is open.

When one poppet valve is open the associated piston valve 69 or 70 controlling a secondary fluid conduit 67 or 68 is placed into the position closing the conduit to the annular feed chamber 8 or 23, and the piston valve controlling the other conduit 67 or 68 is placed to open the conduit 67 or 68 and the second fluid under pressure will flow from the conduit 67 or 68 into the annular feed chamber 8 or 23. Thus the secondary fluid will flow into the annular feed chamber 8 or 23 when there is no combustion in the associated combustion chamber and no flow therefrom to the annular feed chamber, and the secondary fluid will not flow into an annular feed chamber 8 or 23 when the combustion gases flow from a combustion chamber into the annular feed chamber.

When either poppet valve 84 or 85 is open, so there is combustion in turbine device A or A¹, the slide valves 61 and 61 will open the exhaust ports 51 and 51 of the turbine devices A or A¹ to the gas conduit, and when a poppet valve 84 or 85 is closed the associated ports 51 to gas conduits 56—57 will be closed and the exhaust ports to secondary fluid conduits 50ᵃ will be open. Thus always when there is combustion the flow will be through the turbine device A or A¹ into gas conduits 56 and 57 and when there is no combustion the flow will be through the turbine device A or A¹ into the secondary fluid conduits 50ᵃ.

In the position of parts shown in Figure 2, there is combustion in the turbine device A¹ and no combustion in the turbine device A. In A¹, the air from conduit 113 flows into the combustion chamber carrying fuel with it and this is ignited in the combustion chamber 81 and the combustion gases at a temperature of say two thousand to two thousand five hundred degrees Fahrenheit, flow into the annular chamber 23 and there the combustion gases divide into streams flowing axially each way and each stream is again divided by the nozzle guide vanes or expansion nozzles into many streams directed in the proper tangential angle rotationally, to give driving thrust the same way to the rotors, and the combustion gases then pass through the turbine annular spaces to drive the turbine rotors and the gases at each end of turbine device A¹ pass through exhaust ports 51 to the exhaust conduits 56 and 57; and during this same period of the cycle of combustion or flow, secondary fluid under pressure flows from the secondary fluid conduit 67 into the annular chamber 8 of turbine device A and in annular chamber 8 this secondary fluid divides into two streams and each stream is again divided by the nozzle guide vanes or expansion nozzles so that the secondary fluid is directed in the tangential direction rotationally against the blades of the rotors of turbine device A to drive shaft 1, and the secondary fluid then passes through the exhaust ports 50 into the secondary fluid exhaust conduits 50ᵃ. In the next alternate period of the cycle of combustion or flow, the combustion gases flow in the same manner in turbine device A and the secondary fluid flows in the same manner in turbine device A¹, air and fuel entering combustion chamber 80 from conduit 113 and the fuel apertures, and secondary fluid flows into the annular chamber 23 from the secondary fluid conduit 68. In either turbine device A and A¹, when there is flow of combustion gases there is not flow of secondary fluid and vice versa. At no time is there flow of combustion gases into the secondary fluid exhaust conduits and at no time is there flow of secondary fluid into the combustion gas exhaust conduits, although the timing valve 117 may have its conduits so arranged, that there is slight overflow of secondary fluid into the combustion gas conduits at the beginning of each secondary flow period in a turbine device A or A¹, so that there will be either none or very slight admixture of combustion gases with secondary fluid in the secondary fluid conduits. This should especially be the case, where the secondary fluid is steam, as may be the case, and the steam is condensed for return. It should be noted here that any cleansing devices, such as chemical means (not shown), may be used for freeing the secondary fluid of impurities before its return into the turbine devices.

It will be noted that the coil springs 96 or 97 are compression springs so as to positively return the poppet valves to their seats when the pressure of fluid below the control piston is released by valve 117. The upward movement of either poppet valve with its valve rod may by the thrust upward move the walking beam to assist in closing the other poppet valve. But as shown in Fig. 7, the walking beam may be eliminated and two levers 128 and 129 (Fig. 7) substituted, so that each poppet valve is independently operated by its control piston. In this case, however, the poppet valve rods 88—89 are connected by connecting rods 130, 131 with the poppet valve rod so that the lever 128 or 129, as the case may be, is positively pulled downwardly by the associated coil spring 96 or 97 so that the associated valve 69 or 70 may be moved downwardly. This modified form is to permit various timing of the poppet valves, etc. In Fig. 10, assume the two circles to represent each the same period of time, and a period which is the total period of time elapsed during one cycle or rotation of control valve 117; circle X will represent the flow in one turbine device A and circle Y will represent the flow in the other turbine device A¹. During period from I to II (clockwise) secondary fluid will flow into turbine device A and from it into the secondary fluid conduits, and during this same part of the cycle, combustion gases will flow through turbine device A¹ during the period III to IV (clockwise); and during the period from II to I (clockwise) combustion gases will flow through turbine device A to the combustion gas conduits, and during this same period IV to III (clockwise) secondary fluid will flow through turbine device A¹ into the secondary fluid conduits. This cycle is continuously repeated by the effect of valve 117.

Referring now to Figure 8 showing one manner of association, a preferred manner of association of my turbine means with other elements or means to form a complete power plant, the other means, contributing to the efficiency of the plant as a whole, is here shown merely diagrammatically as in the turbine means which has been above described in connection with Figures 1, 2, 3, 4. The means especially described in Figs. 1, 2, 3, 4, is designated A—A¹. Pipe lines which cross other pipe lines are shown by dotted lines to thus distinguish them as separate lines. The gas exhaust conduits 56 and 57 are joined in one conduit 132 which delivers into the intake or high pressure chamber 133 of a low pressure gas turbine of any type designated 134, and the exhaust chamber 135 thereof delivers by exhaust conduit 136 to a chamber 137 which in turn delivers into one end of the space 138 interiorly of a heat transfer unit 139, and the opposite end thereof delivers by smoke stack or exhaust 140 directly to atmosphere.

The exhaust steam or secondary fluid conduits 50ᵃ and 50ᵃ are joined in one conduit 141 which delivers into the high pressure chamber 142 of a steam or secondary fluid turbine 143 and the exhaust end of this turbine 143 delivers by conduit 144 to a condenser or cooler heat transfer means 146 and the secondary fluid after condensation or cooling therein passes by conduit 126 to the secondary or water pump 49 where the secondary fluid is again pumped under pressure to the pipe 147 and thereby to the header 148 of the heat transfer unit 139 and passing through the pipes 149 thereof passes as steam or heated secondary fluid to the pipes 67, 68 and thereby, as controlled by the valve timing means 117, into the annular chambers 8 and 23 of the turbine devices A and A¹. The turbines 134 and 143 respectively drive air compressors 150 and 151 and the latter each separately induct fresh atmospheric air by way of intake pipes 152 and 153 from the atmosphere, so that this fresh air may continuously be compressed by the compressors to a pressure which may be say sixty or seventy pounds or may be as much as 100 pounds or more, depending on the construction, and this compressed air flows by way of the common compressed air conduit 113 to the combustion chambers of the turbine devices A and A¹ according to the control of the control valve means 117, so that this compressed air alternately is permitted to flow into the annular chambers of the turbine devices A and A¹, respectively. The power shaft 36 is connected to any load, as a ship's propeller, or electric generator armature, or any load drive shaft.

It will be noted that the condensing or cooling means 146 for the secondary fluid has any supplementary devices such as air separation and exhaust means and cooling air supply and separated conduit spaces for flow of the cooling air or fluid and the secondary fluid, which are commonly used with condenser or cooling means, this means being diagrammatically shown only. Likewise the secondary fluid is separated from the hot exhaust gases passing through the heat transfer unit 139, so that the secondary fluid may be heated therein as a separate fluid by the turbine exhaust gases. The pump 49 may draw additional secondary fluid gas, air or water from any supply (not shown). The second system may be a relatively closed system under pressure.

It should be noted that it is assumed that water may sometimes be used as the secondary fluid being condensed after exhaust from the means A and A¹ and used repeatedly, but if a secondary fluid which does not readily condense is used such as air or carbon dioxide, then this secondary fluid will be merely cooled and recompressed by the pump 49 or any other pump means such as an axial flow turbine compressor or centrifugal compressor used in substitution.

It should be noted that during alternate periods when the secondary fluid passes through either turbine device A or A¹, the turbine means will lose heat to the secondary fluid especially in the annular chamber and high or earlier stages of blades, stator and rotor, and that this rate of heat loss will depend on the weight of the blade parts and rotor casing parts, and that this rate may be predetermined by the weight of these parts, and may be predetermined or adjusted as necessary, by variance of the volume of secondary fluid compressed and by variance of the pressure of this secondary fluid as its pressure is predetermined by the construction. Likewise, the rate of heat absorption and quantity of heat absorption per period, may be varied by predetermination of the construction, so that the air compression for use and volume of air and fuel used per period or cycle, may be higher or lower, so that thus there may be increase or decrease of the relative speed of heat increase in the metal of the devices. Likewise the proportion of fuel and air may aid in this determination or adjustment. The rotor and blade parts and casing and stator blade parts may have such heavy construction, that there is greater absorption of heat per period or cycle, than would ordinarily be the case, and accordingly there would be a greater quantity of heat to be absorbed during absorption periods of the alternating cycles.

The flow of combustion gases and the relative flow of secondary fluid may also be adjusted or varied, in construction, changing the relative proportions of time of combustion gas flow and secondary fluid flow in each turbine device A or $A^1$, by changing the relative sector of the port for causing combustion and the port for causing secondary flow in valve 117. And the relative proportions of timing of combustion gas flow and secondary fluid flow may be varied in construction by utilizing say three turbine devices such as A, and three such devices are shown in the construction illustrated in Fig. 9, where A, $A^1$, and $A^2$ are each turbine devices such as A in Figs. 1, 2, 3, 4, and these three are united for control by one valve means 116—117 operated by electric motor 118 or any means, the valve means 116—117 being similar to the valve means 116—117 of Figs. 1, 2, 3, 4, except that it similarly controls three turbine devices A, $A^1$ and $A^2$, the timing being modified as necessary, preferably to give a shorter combustion period to each, but in alternative construction, to give a shorter secondary flow period and longer combustion flow, period, in each turbine device.

In Fig. 8, a blower 154 driven by electric motor 155 may induct atmospheric air carburetted at 156 by fuel from conduit 157, and pass the carburetted air to combustion gas chamber 137 and thereby to space 138 of the heat transfer means 139, to heat the secondary fluid initially for provision of starting fluid for driving shafts 1—2 in starting. Any ignition means may be used in chamber 137 for ignition of this auxiliary air and fuel. This supplemental means may be used to provide additional heat to the secondary fluid for abnormal prower production, and in some constructions, as deemed necessary, for normal power production, the auxiliary combustion supply means providing then for additional heating of the secondary fluid, but this would preferably not be used for normal operation. In some constructions, the heating of the secondary fluid in the heat transfer means may not be quite as much as may be given to the secondary fluid in preheating, without impairing the use of the secondary fluid in the turbines A and $A^1$ for cooling therein, and in such constructions, this supplemental heating means may be used for imparting some heating to the secondary fluid, to provide the necessary or most efficient heat utilization and power output in the device.

The air and fuel ratio, as used in the combustion pahes in A and $A^1$, may in this means more nearly approach the theoretical 16-1 ratio, or such ratio as provides near perfect and complete combustion, without surplus air, thus increasing the efficiency over ordinary devices and this is beneficial and contemplated operation in my device.

When there is not air and fuel flowing into chamber 137 from carburetor 156, then a flap valve 158 will automatically close the chamber 137 against flow through carburetor 156, so that there may not be this flow, but so that the exhaust gases may continue to flow from pipe 136 into the heat transfer unit 139.

As was above stated, there may be variation of several factors in the operation, depending on the construction, but for illustration of the contemplated temperature cycle which may be used, or its relative temperatures, the temperature cycle or temperatures of flow may be somewhat as follows, in some constructions: Air from atmosphere will enter the compressor means 150 and 151 or any other compressor means, and this air is compressed to about seventy pounds and the air at this pressure will pass into conduit 113 at a temperature of several hundred degrees Fahrenheit, or lower if intercooling means is provided, as may be done and as is commonly known in connection with air compressors; the air mixed with fuel will burn in combustion chambers 80 and 81 at a temperature which may be as high as two thousand degrees Fahrenheit (more or less); from either combustion chamber the combustion gases will flow into turbine A or $A^1$ at a temperature nearly that figure; as the combustion gases expand in the turbines, either one at one time, some heat is lost by the expansion and performance of work and some heat is lost by absorption of heat by the metal of the turbine structures; the exhaust gases from turbines A—$A^1$ will flow into conduits 56—57 at a temperature which may be 1200 degrees Fahrenheit or approach that figure; the gases will flow into conduit 132 and to low pressure turbine 134 at approximately that figure and will lose heat by expansion and performance of work in turbine 134, and pass to heat transfer unit 139 at a temperature which may be as high as six to eight hundred degrees Fahrenheit, and a pressure near atmosphere; the exhaust gases will give up heat to the secondary fluid passing through pipes 143 raising the temperature of the secondary fluid to say six to seven hundred degrees Fahrenheit and the gases will then pass to atmosphere by stack 140 at a temperature which may be say 250 to 300 degrees Fahrenheit. The secondary fluid will have a temperature cycle or change which is approximately as follows: The secondary fluid (as water) may pass to pipe 147 at a temperature of 200 degrees or near that figure; in pipes 148 (which should preferably be arranged in counterflow as is commonly done) the secondary fluid will be heated to a temperature of five to six hundred degrees Fahrenheit and will pass as heated compressed fluid (as steam) to pipes 67—68 and thereby to annular chambers 8 and 23 (in the alternating cycle as described) and from those chambers will pass through turbines A or $A^1$ (alternating) and will, in passing into annular chambers 8 and 23 and in the early stages of the turbine blades, absorb heat from the metal of the structures including that of rotors 3—4—19—20 and although losing some heat by expansion and performance of work will emerge from the turbines A or A¹ at a temperature which may be as high as four hundred degrees or thereabouts and pass at a pressure somewhat above atmosphere into pipes 50ᵃ and therby to low pressure turbine 143 and passing therethrough will be lowered in pressure and temperature, and may enter the condenser or cooler means 145 at a pressure which may be atmospheric or below atmosphere depending on the vacuum present in condensing means 146, and as condensed or cooled secondary fluid it will pass into any storage well or directly into pipe 126 and be repumped by pump 49 into conduit 147 for repetition of the cycle. These temperatures and pressures will vary according to the construction and the length of the alternating heat absorption and cooling periods which is determined by the valve means 117.

In the claims the words combustion chamber means are contemplated to mean the means provided by chambers 80 and 81. While I have shown particular devices and combinations of devices in the description of my device, other detailed devices and combinations of devices may be utilized without departure from the spirit and contemplation of my invention and especially in this regard different types of power production or utilization means may be utilized for work production therein.

What I claim is:

1. In a power production means, a multiple number of individually encased turbine rotor means, inter-connecting drive means operatively inter-connecting the turbine rotors, a multiple number of combustion chambers, means for introduction of air and fuel under pressure for combustion to each of said combustion chambers, a passage from each of said combustion chambers to a connected one of said turbine rotor means, means actuatable to periodically in rotation interrupt the flow of combustion gases from said combustion chambers to each of said encased turbine rotor means, a means for supply of secondary fluid under pressure, means for passage of said secondary fluid under pressure to each of said encased turbine rotor means, means actuatable to periodically in rotation interrupt the flow of said secondary fluid under pressure to each of said encased turbine rotor means the interruption of flow of said secondary fluid under pressure to an encased turbine rotor means occurring during periods when there is flow of combustion gases to the turbine rotor means, a discharge from each encased turbine rotor means, a combustion gas exhaust conduit, a secondary fluid exhaust conduit, a cyclically actuatable discharge valve means between the exhaust discharges and the two last named conduits, means actuating and coordinating the actuation of the said discharge valve means and the other means interrupting flow of combustion gases and secondary fluid to effect periodic connection of each discharge from an encased turbine rotor means with the combustion gas exhaust conduit when there is flow of combustion gases to the associated encased turbine rotor means, and to effect connection of each said discharge from an encased turbine rotor means with the secondary fluid exhaust conduit when there is flow of secondary fluid to the associated encased turbine rotor means.

2. In a power production means, a multiple number of encased turbine rotor units each having torque developing elements, a multiple number of combustion chambers, a passage from each of said combustion chambers to a connected one of said turbine rotor units, a means for supply of air and fuel under pressure to each of said combustion chambers, means actuatable to periodically in rotation interrupt flow of air and fuel from said supply means to each of said combustion chambers, means for supply of a secondary fluid under pressure, said means including a compressing means and means for passage from said supply of secondary fluid under pressure to each of said turbine rotor units, means actuatable to periodically in rotation interrupt flow of said secondary fluid from said supply thereof to each of said turbine rotor units the interruption of flow of secondary fluid to a turbine rotor unit occurring during intervals when combustion geases flow to the said turbine rotor unit, a discharge from each turbine rotor unit, a combustion gas exhaust conduit, a secondary fluid exhaust conduit, a cyclically actuatable discharge valve means between the discharges from the turbine rotor units and the two last named exhaust conduits and means actuating and coordinating the actuation of the said discharge valve means with the actuation of the means interrupting flow of combustion gases and secondary fluid to effect periodic connection of each discharge from a turbine rotor unit with the combustion gas exhaust conduit when there is flow of combustion gases to the associated turbine rotor unit and to effect connection of each discharge from a turbine rotor unit with the secondary fluid exhaust conduit when there is flow of secondary fluid to the associated turbine rotor unit, a heat abstraction means included in the said secondary fluid exhaust conduit, a return for said secondary fluid from said heat abstraction means to said compressing means for supply of secondary fluid under pressure, a heat transfer means included in said passage from said means for supply of secondary fluid under pressure to impart heat to said secondary fluid, means for supply of heat from exhaust combustion gases to said heat transfer means for heating said secondary fluid passing therethrough.

3. In a power production means, a multiple number of individually encased turbine rotor units each having torque developing elements, inter-connecting drive means operatively inter-connecting the rotors, a multiple number of combustion chambers, a means for supply of air and fuel under pressure to said combustion chambers, a passage from each of said combustion chambers to a connected one of said turbine rotor units, means actuatable to periodically in rotation interrupt the flow of combustion gases from said combustion chambers to each of said turbine rotor units, a means for supply of a secondary fluid under pressure including a compressing means and means for passage of said secondary fluid under pressure to each of said turbine rotor units, means actuatable to periodically in rotation interrupt the flow of secondary fluid under pressure to each of said turbine rotor units the interruption of flow of said secondary fluid under pressure occurring as to each turbine rotor unit during intervals when combustion gases flow to said turbine rotor unit, a discharge from each turbine rotor unit, a combustion gas exhaust conduit, a secondary fluid exhaust conduit, a cyclically actuatable discharge valve means between the discharges from the turbine rotor units and the two last named exhaust conduits and means actuating and coordinating the actuation of the said discharge valve means with the actuation of the means interrupting flow of combustion gases and secondary fluid to effect periodic connection of each discharge from a turbine rotor unit with the combustion gas exhaust conduit when there is flow of combustion gases to the associated turbine rotor unit and to effect connection of each discharge from a turbine rotor unit with the secondary fluid exhaust conduit when there is flow of secondary fluid to the associated turbine rotor unit, a cooling means through which the secondary fluid exhaust conduit is passed for heat abstraction from said secondary fluid, a return for said secondary fluid after said last named cooling passage to said compressing means for supply of secondary fluid under pressure, means for heat transfer included in said passage from said means for supply of secondary fluid under pressure to impart heat to said secondary fluid from combustion gases discharging through said combustion gas exhaust conduit.

4. In a power production means, a multiple number of individually encased turbine rotor units each having torque developing elements, a multiple number of combustion chambers each having a passage to a connected one of said turbine rotor units, a means to supply air and fuel under compression, an exhaust discharge from each turbine rotor unit, a valve means controlling flow from said means supplying air and fuel to said combustion chambers and actuatable cyclically to procure periodic flow of air and fuel under pressure to said chambers in cyclic rotation; a means including a compressing means for supply of a secondary fluid under compresssion and under temperature less than the temperature of combustion gases flowing from said combustion chambers, a passage from said means supplying secondary fluid to each of said turbine rotor units, a valve means controlling flow from said means supplying secondary fluid to said turbine rotor units and actuatable cyclically in coordination with the actuation of the first named valve means to procure periodic flow of said secondary fluid to said turbine rotor units in cyclic rotation such that there is passage of said secondary fluid to a turbine rotor unit during intervals when combustion gases do not flow from the combustion chambers to said turbine rotor unit, a combustion gas exhaust conduit and a secondary fluid exhaust conduit, a cyclically actuatable discharge valve means between the exhaust discharges and the two last named conduits; means actuating and coordinating the actuation of the discharge valve means and the other valve means to procure periodic connection of each exhaust discharge with the combustion gas exhaust conduit when there is flow of combustion gases to the associated turbine rotor unit, and to procure connection of each exhaust discharge with the secondary fluid exhaust conduit when there is flow of secondary fluid to the associated turbine rotor unit.

5. In a power production means, a multiple number of individually encased turbine rotor units each having torque developing elements, inter-connecting drive means operatively inter-connecting the rotors, a multiple number of combustion chambers, a means for supply of air and fuel under compression to said combustion chambers, a passage from each combustion chamber to a connected one of said turbine rotor units, an exhaust discharge from each turbine rotor unit; a means including a compressing means to supply a secondary fluid under compression and under temperature less than the temperature of combusion gases flowing from said combustion chambers to said turbine rotor units, a passage from said means supplying secondary fluid to each of said turbine rotor units; a combustion gas exhaust conduit; a secondary fluid exhaust conduit delivering to said compressing means for secondary fluid; a means for cooling secondary fluid flowing through said secondary fluid exhaust conduit; a valve means for controlling flow and actuatable cyclically to effect periodic flow of combustion gases from said combustion chambers of said turbine rotor units in cyclic rotation, and to effect periodic flow of said secondary fluid to said turbine rotor units in cyclic rotation such that there is passage of said secondary fluid to a turbine rotor unit during intervals when combustion gases do not flow from a combustion chamber to a turbine rotor unit, a cyclically actuatable discharge valve means between the exhaust discharges from the turbine rotor units and the said combustion gas exhaust conduit and secondary fluid exhaust conduit and means actuating and coordinating the actuation of the said discharge valve means with the actuation of the valve means to effect flow of combustion gases and secondary fluid to effect periodic connection of each exhaust discharge from a turbine rotor unit with the combustion gas exhaust conduit when there is flow of combustion gases to the associated turbine rotor unit and to effect connection of each exhaust discharge from a turbine rotor unit with the secondary fluid exhaust conduit when there is flow of secondary fluid to the associated turbine rotor unit.

6. In a power production means, a multiple number of individually encased turbine rotor units each having torque developing elements, inter-connecting drive means operatively interconnecting the rotors, a multiple number of combustion chambers, a means for supply of air and fuel under compression to said combustion chambers, a passage from each combustion chamber to a connected one of said turbine rotor units, an exhaust discharge from each turbine rotor unit; a means including a compressing means to supply a secondary fluid under compression and under temperature less than the temperature of combustion gases flowing from said combustion chambers to said turbine rotor units; a passage from said means supplying secondary fluid to each of said turbine rotor units; a combustion gas exhaust conduit to which each exhaust discharge may discharge; a secondary fluid exhaust conduit to which each exhaust discharge may discharge; a power developing turbine to which said secondary fluid exhaust conduit may discharge; a secondary fluid cooling means to which said power developing turbine may discharge; a valve means for controlling flow and actuatable cyclically to effect periodic flow of combustion gases from said combustion chambers to said turbine rotor units in cyclic rotation, and to effect periodic flow of said secondary fluid to said turbine rotor units in cyclic rotation such that there is passage of said secondary fluid to a turbine rotor unit during intervals when combustion gases do not flow from a combustion chamber to the turbine rotor unit, and a cyclically actuatable discharge valve means between the exhaust discharges from the turbine rotor units and the said combustion gas exhaust conduit and the said secondary fluid exhaust conduit and means actuating and coordinating the actuation of the said discharge valve means with the actuation of the valve means first named to effect periodic connection of each exhaust discharge from a turbine rotor unit with the combustion gas exhaust conduit when there is flow of combustion gases to the associated turbine rotor unit and to effect connection of each exhaust discharge from a turbine rotor unit with the secondary fluid exhaust conduit when there is flow of secondary fluid to the associated turbine rotor unit.

7. All of the means as described and as claimed in claim 4 and in combination; a secondary turbine to which said secondary fluid exhaust conduit discharges; a secondary fluid cooling means to which the secondary turbine discharges; a conduit from the secondary fluid cooling means to the means for supply of secondary fluid under compression.

8. All of the means as described and as claimed in claim 4 and in combination; a secondary turbine to which said secondary fluid exhaust conduit discharges; a secondary fluid cooling means to which the secondary turbine discharges; a conduit from the secondary fluid cooling means to the means for supply of secondary fluid under compression; heat transfer means providing passages for flow of secondary fluid between the means for supply of secondary fluid under compression and the turbine rotor units, the heat transfer means including combustion gas exhaust passages to which the combustion gas exhaust conduit is connected and discharges for transfer of heat therefrom to the secondary fluid under compression.

9. All of the means as described and as claimed in claim 4 and in combination: a secondary fluid turbine to which said secondary fluid exhaust conduit discharges, a secondary fluid cooling means to which the secondary fluid turbine discharges, a conduit from the secondary fluid cooling means to the means for supply of secondary fluid under compression; a low pressure combustion gas turbine to which the combustion gas exhaust conduit discharges and a discharge therefrom to atmosphere.

10. In a power production means, a multiple number of individually encased turbine units each having a rotor bearing torque developing elements, inter-connecting drive means between the rotors to operatively inter-connect the rotors, a multiple number of combustion chambers each associated with one turbine unit and having a passage from the combustion chamber to the turbine unit to discharge thereto, a means supplying air and fuel under pressure and having delivery means therefrom to each combustion chamber, a valve means cooperating with the delivery means and actuatable to cyclically interrupt flow through the delivery means to the combustion chambers of air and fuel, a means for supply of a secondary fluid under pressure and secondary delivery means therefrom to each turbine unit and valve means cooperating with the secondary delivery means and actuatable to cyclically interrupt flow through the secondary delivery means to each turbine unit during intervals when combustion gases flow to the turbine unit.

ADOLPHE C. PETERSON.

References Cited in the file of this patent

UNITED STATES PATENTS

| Number | Name | Date |
|---|---|---|
| 525,271 | Langen | Aug. 28, 1894 |
| 642,949 | Baillie et al. | Feb. 6, 1900 |
| 2,035,482 | Jodeiko | Mar. 31, 1936 |
| 2,095,991 | Lysholm | Oct. 19, 1937 |
| 2,303,295 | Allen | Nov. 24, 1942 |
| 2,320,391 | Wakefield | June 1, 1943 |
| 2,322,987 | West | June 29, 1943 |
| 2,403,388 | Morey et al. | July 2, 1946 |
| 2,493,873 | Hill | Jan. 10, 1950 |
| 2,539,960 | Marchant et al. | Jan. 30, 1951 |